United States Patent [19]

Schulz

[11] 4,018,403

[45] Apr. 19, 1977

[54] CASSETTE LOADER FOR VIDEO RECORDER/REPRODUCER

[75] Inventor: Gordon Schulz, Villa Park, Calif.

[73] Assignee: Odetics, Inc., Anaheim, Calif.

[22] Filed: Jan. 19, 1976

[21] Appl. No.: 650,455

[52] U.S. Cl. .................................. 242/198; 360/96
[51] Int. Cl.² .................... G03B 1/04; G11B 15/32; G11B 23/04
[58] Field of Search ................. 242/198, 200, 210; 360/93, 96

[56] References Cited

UNITED STATES PATENTS

| | | | |
|---|---|---|---|
| 3,764,089 | 10/1973 | Yoshida | 242/198 |
| 3,807,653 | 4/1974 | Van der Maaden | 242/198 |
| 3,832,734 | 8/1974 | Childress, Jr. et al. | 360/96 |
| 3,870,247 | 3/1975 | Carisey | 242/198 |
| 3,882,542 | 5/1975 | Nakamichi | 360/96 |
| 3,896,492 | 7/1975 | Socias | 360/93 |

Primary Examiner—Leonard D. Christian
Attorney, Agent, or Firm—Philip M. Hinderstein

[57] ABSTRACT

A loading mechanism for delivering a standard video cassette onto a pair of reel drive hubs of a video recorder/reproducer including an open shelf having a bottom, opposed side walls, and opposed top sections, the shelf being horizontally translatable under control of the cassette itself between a forward, cassette receiving position and a rearward position; means for sensing that both rear corners of the cassette have reached the rearward position and that the operator has released the cassette; means for lowering the shelf and the video cassette therein onto the reel drive hubs, the hubs extending through a pair of holes in the shelf bottom; a plurality of posts extending through holes in the shelf bottom, adjacent the four corners thereof, for contacting the bottom of the cassette in the lowered position of the shelf; means including the top shelf sections for clamping the side edges of the cassette onto the posts; and means operative when the shelf reaches the lowered position for momentarily applying a force to the top of the cassette, directly above the reels therein, to force the reels onto the reel drive hubs.

17 Claims, 10 Drawing Figures

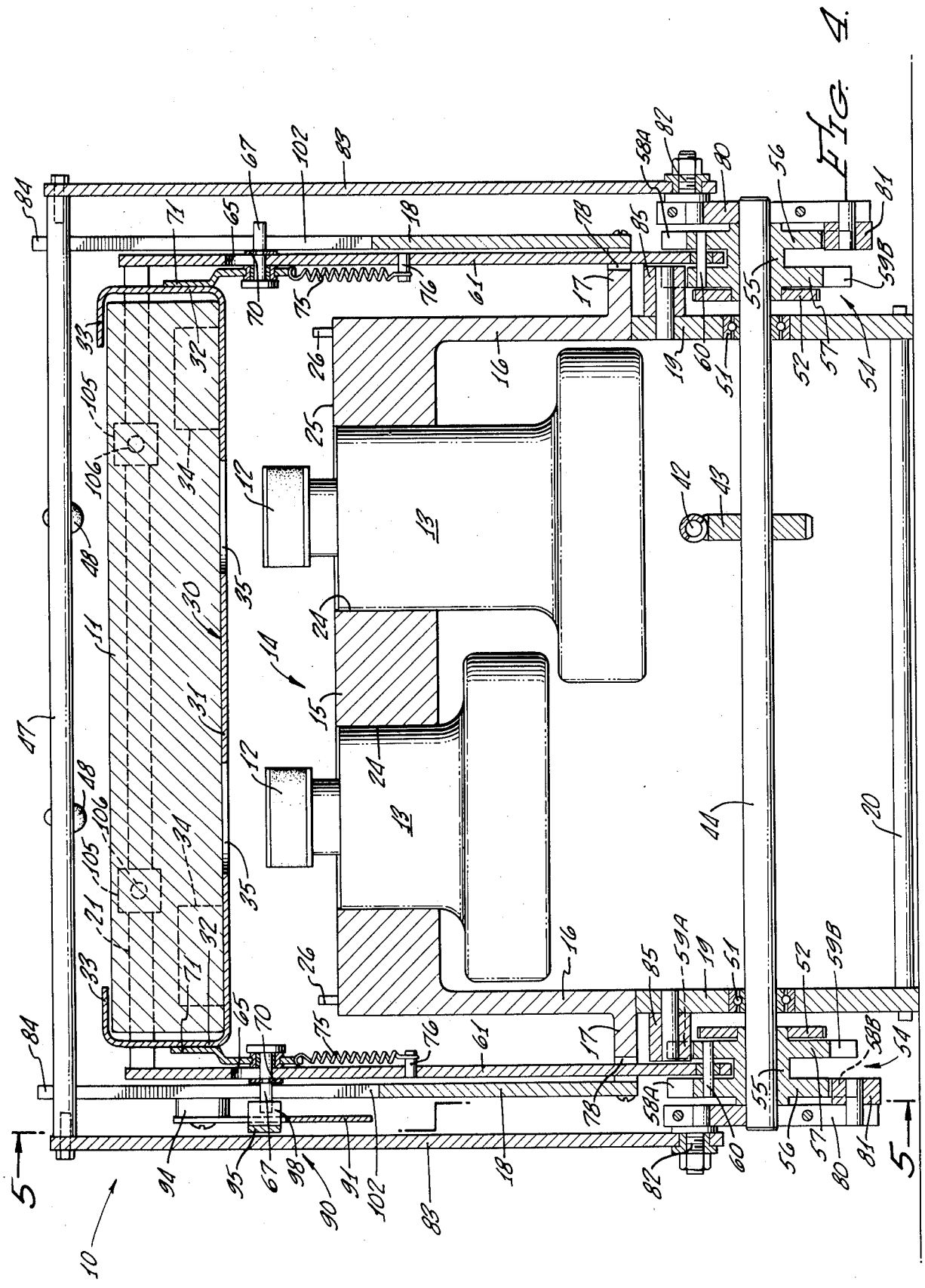

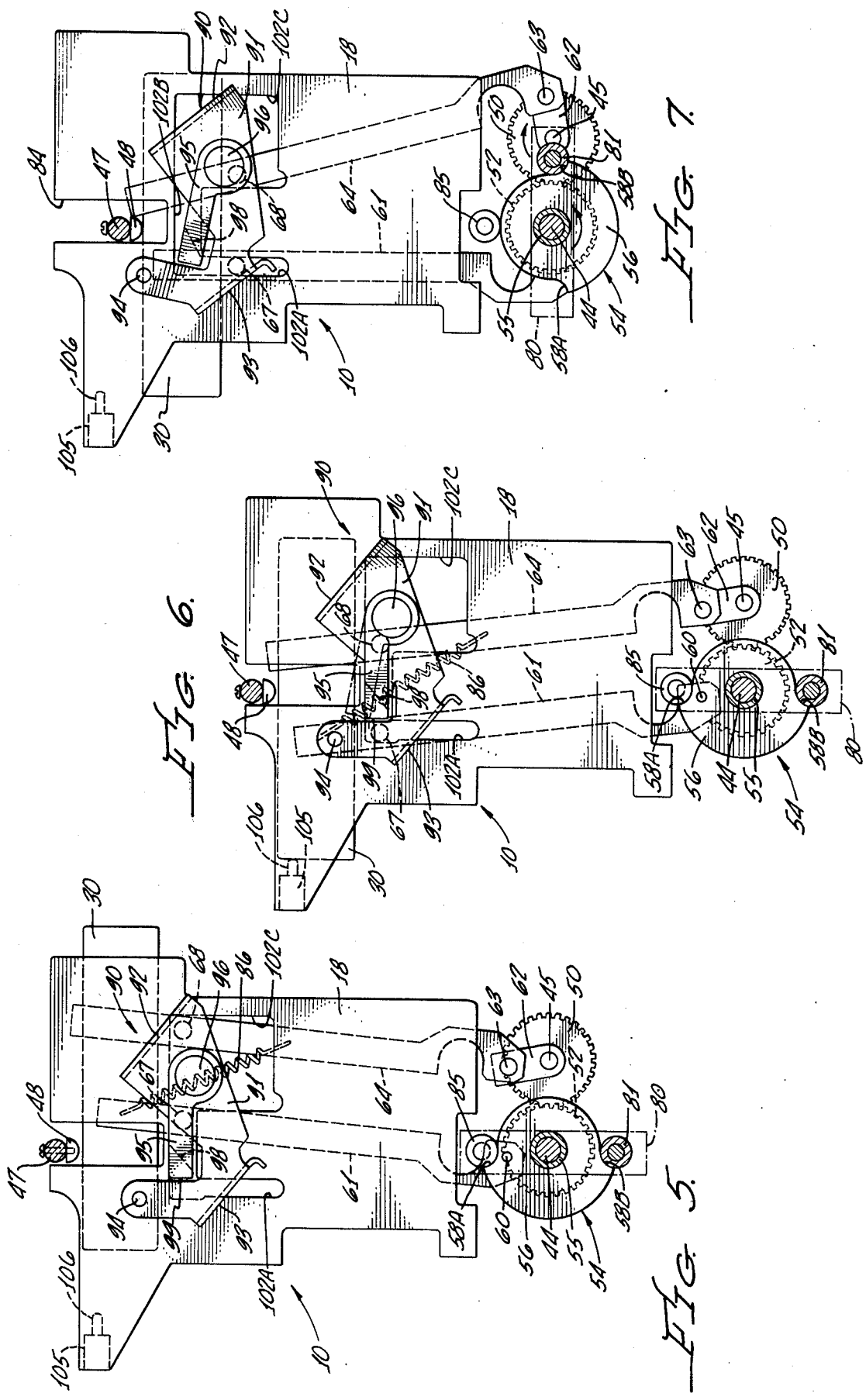

CASSETTE LOADER FOR VIDEO RECORDER/REPRODUCER

BACKGROUND OF THE INVENTION

1. Field of the Invention

The present invention relates to a cassette loader for a video recorder/reproducer and, more particularly, to a loading mechanism for reliably delivering a standard video cassette onto a pair of reel drive hubs of a video recorder/reproducer, insuring proper seating of the reels on the hubs, and preventing jamming of the video tape.

2. Description of the Prior Art

Video recoding tape is commonly supplied in a standard type of cassette to eliminate the problems associated with open reels and the threading of the tape into a video recorder/reproducer. A variety of video recorder/reproducers have been developed for receiving standard video cassettes.

When using a standard video cassette with a video recorder/reproducer, the first problem becomes that of mating and demating the reels within the cassette to the reel drive system of the recorder/reproducer. For this purpose, a number of different systems have been developed for receiving the video cassette and lowering it onto the reel drive hubs which engage the reels for driving the tape in opposite directions.

The cassette loaders for video recorder/reproducers that have been developed heretofore have been intended for use with video recorder/reproducers designed for recording and playing back standard television type signals. In such systems, the tape travels at low speed, typically 3 ¾ inches per second during play back and 45 inches per second during rewind. Accuracy and reliability of operation have been relatively unimportant considerations.

On the other hand, the present cassette loader is designed for a video recorder/reproducer intended for use in a document acquisition and retrieval system. This environment places a number of constraints on the video tape and cassette which cannot be achieved with conventional cassette loaders. For example, the present cassette loader is intended for use in a system where tape travels in two directions, during a search mode, at speeds in excess of 400 inches per second. It is obvious that when tape is run at such speeds, it cannot rub, bump, or touch anything within the cassette or the tape may be irreversibly damaged and the data thereon lost. Steps must also be taken to insure that the cassette reels will be accurately seated on the reel drive hubs since the reel drive will typically be part of a servo system.

Another problem results from the fact that standard video cassettes are made by a number of different manufacturers and slight variations in tolerances and dimensions of the cassettes result. Furthermore, the video cassettes are typically made of plastic and warp in use. If a warped or deviated cassette is placed in a recorder/reproducer, the anomaly may cause jamming of the video tape during the high speed search mode.

If a cassette loader and a video recorder/reproducer are to be usable in a document acquisition and retrieval system, the video cassettes must be front loadable into the system in a simple, foolproof manner by a relatively untrained operator. This too has been a problem with cassette loaders designed heretofore. Still further, because of the environment, the recorder/reproducer may be positioned at any angle, not necessarily horizontal, requiring the video cassette to be inserted either horizontally or vertically or in any other angular orientation. Accordingly, it is desirable that the cassette loader not be subject to the influences of gravity, but be able to operate in any position. A cassette loader meeting the above requirements has been unavailable heretofore.

SUMMARY OF THE INVENTION

According to the present invention, there is provided a cassette loader for a video recorder/reproducer which virtually eliminates the problems discussed above. The present cassette loader provides for the foolproof insertion of a cassette into a video recorder/reproducer by an untrained operator in a manner which minimizes the jamming problem. With the present loader, the video cassette is delivered onto a pair of reel drive hubs in such a manner that the proper seating of the reels onto the hubs is insured. The present loader mechanism establishes both a vertical and horizontal position for the cassette and clamps the cassette in such position so as to eliminate the problems caused by warping or finite variations in the tolerances and dimensions of the cassette. The present cassette loader may be operated in any orientation and will eject the cassette when it is desired to remove it from the video system.

Briefly, the present loading mechanism for delivering a standard video cassette onto a pair of reel drive hubs of a video recorder/reproducer comprises an open shelf having a bottom, opposed side walls, and opposed top sections, the shelf being horizontally translatable under control of the cassette itself between a forward, cassette receiving position and a rearward position; means for sensing that both rear corners of the cassette have reached the rearward position and that the operator has released the cassette; means for lowering the shelf and the video cassette therein onto the reel drive hubs, the drive hubs extending through a pair of holes in the shelf bottom; a plurality of posts extending through holes in the shelf bottom, adjacent the four corners thereof, for contacting the bottom of the cassette in the lowered position of the shelf; means including the top shelf sections for clamping the side edges of the cassette onto the posts; and means operative when the shelf reaches the lowered position for momentarily applying a force to the top of the cassette, directly above the reels therein, to force the reels onto the reel drive hubs.

OBJECTS

It is therefore an object of the present invention to provide a cassette loader for a video recorder/reproducer.

It is a further object of the present invention to provide a loading mechanism for reliably deliverying a standard video cassette onto a pair of reel drive hubs of a video recorder/reproducer.

It is a further object of the present invention to provide a cassette loader for a video recorder/reproducer which insures proper seating of the cassette reels on the reel drive system.

It is another object of the present invention to provide a cassette loader for a video recorder/reproducer which prevents jamming of the video tape in use.

It is still aother object of the present invention to provide a cassette loader for a video recorder/reproducer which establishes a vertical and horizontal position for a video cassette and clamps the cassette in such position.

Another object of the present invention is the provision of a cassette loader for a video recorder/reproducer which may be easily used by an untrained operator.

Still other objects, features, and attendant advantages of the present invention will become apparent to those skilled in the art from a reading of the following detailed description of the preferred embodiment contructed in accordance therewith, taken in conjunction with the accompanying drawings wherein like numerals designate like parts in the several figures and wherein;

BRIEF DESCRIPTION OF THE DRAWINGS

FIG. 4 is a vertical section taken through the main drive shaft of FIG. 1; and

FIGS. 5 through 10 are simplified sectional views taken along the line 5—5 in FIG. 4 and showing the sequence of operation of the present cassette loader.

DESCRIPTION OF THE PREFERRED EMBODIMENT

Figure 1:
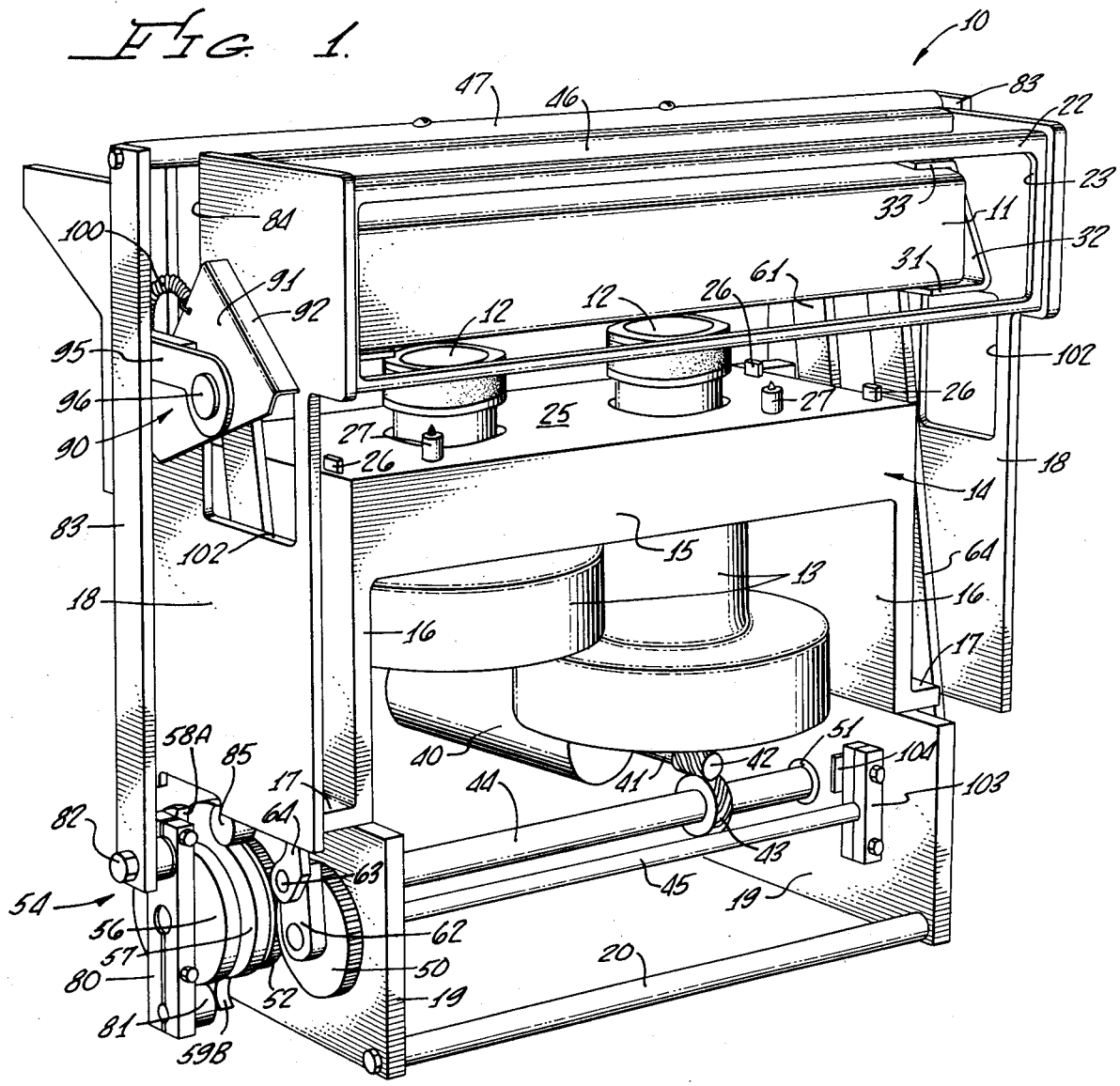
FIG. 1 is a front perspective view of a cassette loader for a video recorder/reproducer contructed in accordance with the teachings of the present invention.
Figure 2:
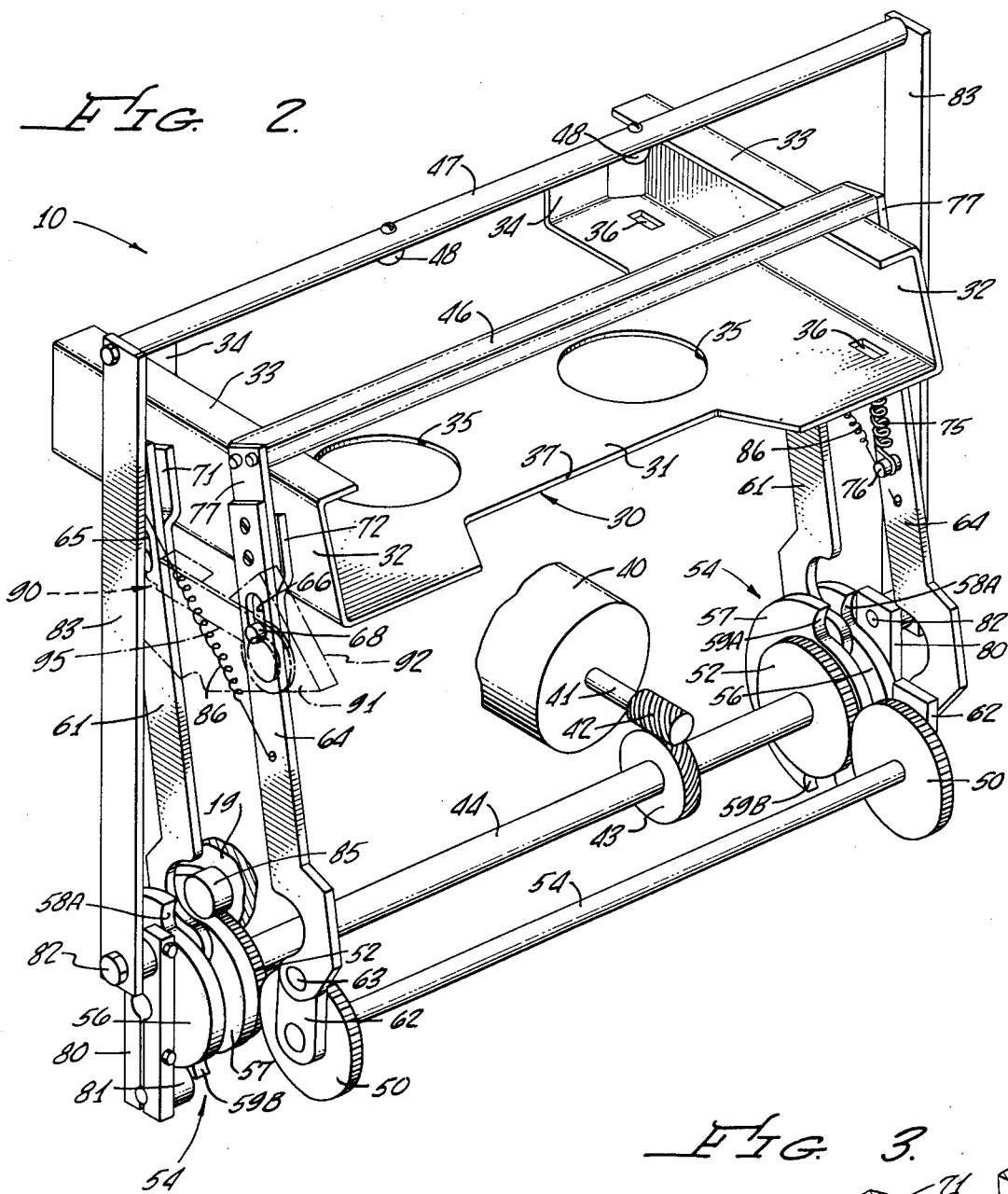
FIG. 2 is a front perspective view of the movable members of the cassette loader of FIG. 1.

Referring now to the drawings and, more particularly, to FIGS. 1-4 thereof, the present cassette loader, generally designated 10, receives a standard video cassette 11 and delivers cassette 11 onto a pair of reel drive hubs 12. Hubs 12 are connected to and driven by motors 13. The main frame element of loader 10 is a hat-shaped base member 14 having a central, generally rectangular, planar section 15 which, for purposes of explanation, will be assumed to be positioned in a horizontal plane, as shown. However, it will be apparent to those skilled in the art that cassette loader 10 may be positioned in any angular orientation and will still operate to perform its intended function.

Extending downwardly in spaced, parallel relationship from the side edges of the bottom of section 15 of base 14 are a pair of identical side sections 16 which terminate, at their lower ends, in identical outwardly extending flanges 17. Connected to the outer extremities of flanges 17 are the lower ends of parallel, spaced, identical, side support plates 18. Also connected to flanges 17 are the upper ends of parallel, spaced, identical lower support plates 19. Base member 14, side plates 18, and lower plates 19 comprise the stationary frame elements of loader 10. Stability between lower support plates 19 is provided by one or more spacer rods 20. Stability between the upper ends of side support plates 18 is provided by means of a rear spacer rod 21 and a front frame element 22 which provides an opening 23 for receipt of cassette 11. Once mated with a video recorder/reproducer, the only portion of cassette loader 10 which would normally be visable would be frame element 22 and those parts which would be visable through opening 23 therein. The remaining operative elements of cassette loader 10 would normally be hidden from view.

As can be seen most clearly in FIG. 4, section 15 of base member 14 has a pair of holes 24 therein for receipt and support of motors 13. Thus, the main bodies of motors 13 are supported in or below section 15 of base member 14, with hubs 12 extending vertically upwardly from the top surface 25 of section 15. Hubs 12 would be parallel and spaced by the same distance as the spacing between the axes of a conventional cassette 11.

Cassette loader 10 includes an open shelf 30 for receiving video cassette 11. Shelf 30 has a planar bottom 31, integral side walls 32, a pair of top lips 33 which are coplanar and parallel to bottom 31, and a pair of rear lips 34. The entire front of shelf 30 is open so that upon insertion through opening 23 in front frame element 22, the rear surface of cassette 11 enters shelf 30, between side walls 32 and between bottom 31 and top lips 33. The spacing between bottom 31 and top lips 33 is slightly greater than the height of a standard video cassette 11. Shelf 30 is positionable in a forward, elevated position, a rearward, elevated position, and a rearward, lowered position, as will be explained more fully hereinafter.

Bottom 31 of shelf 30 has a pair of holes 35 therein which are coaxial with hubs 12 in the rearward positions of shelf 30 so that hubs 12 may extend through holes 35 in shelf bottom 31 in the lowered postion of shelf 30 for engagement of the reels in cassette 11. Bottom 31 of shelf 30 also has four holes 36 therein, at the four corners thereof, holes 36 being alignable with four posts 26 connected to surface 25 of section 15 of base member 14, posts 26 extending through holes 36 and engaging the four corners of the bottom surface of cassette 11 when shelf 30 is in the lowered position. It should also be noted that base member 14 has a pair of pins 27 mounted on surface 25 of section 15, pins 27 being oriented relative to hubs 12 so as to be aligned with standard apertures in the bottom surface of cassette 11 when cassette 11 is in the lowered position. Pins 27 extend through a slot 37 in the front of bottom 31 of shelf 30 when shelf 30 is in the lowered position so as to engage the beforementioned apertures in cassette 11, to define the horizontal position thereof. The function of posts 26 will be described more fully hereinafter.

Shelf 30 is supported and driven along the two sides thereof by identical mechanisms. Accordingly, an explanation of the mechanism on one side of shelf 30 will suffice to describe the mechanism on the other side thereof. Furthermore, all references in the singular shall be understood to be plural, where appliable, and vice versa. The only elements of the drive system which are not duplicated are a drive motor 40 having an output shaft 41 and a worm 42 mounted thereon, worm 42 engaging a worm wheel 43 mounted on a main drive shaft 44 for rotating shaft 44, a rotatable shaft 45, a torsion bar 46, and a cassette compression crossbar 47. These elements will be described more fully hereinafter.

Shaft 45 is supported for rotation by bearings (not shown) in lower support plates 19, shaft 45 having a pair of gears 50 connected to the opposite ends thereof, gears 50 being positioned just outside of support plates 19, beneath flanges 17 of base member 14. Shaft 44 is supported for rotation by bearings 51 in lower support plates 19. Shaft 44 is slightly longer than shaft 45 and has a pair of gears 52 mounted thereon, but not connected thereto, gears 52 being positioned adjacent the opposite ends of shaft 44, just outside of support plates 19, beneath flanges 17 of base member 14. The teeth of gears 52 engage those of gears 50 for simultaneous rotation of gears 50 and 52 and shaft 45.

Shaft 44 also has a pair of assemblies 54 mounted thereon, but not connected to the opposite ends thereof, gears 52 being connected to assemblies 54. More particularly, each assembly 54 includes a collar 55 which is rotatable relative to shaft 44, gears 52 being mounted on the inner ends of collars 55. Collars 55 have made integral therewith an outer disc 56 and a spaced, parallel, inner disc 57, discs 56 and 57 being identical and having first portions of a first diameter and second portions of a second diameter to define a pair of opposed abutments 58A and 58B on disc 56 and a pair of opposed abutments 59A and 59B on disc 57.

A journal 60 extends between and is connected to discs 56 and 57, journal 60 supporting for rotation the lower end of a rear arm 61. Shaft 45 has a pair of link arms 62 connected to the opposite ends thereof, link arms 62 rotating with shaft 45 ad gears 50, each link arm 62 supporting a journal 63. Each journal 63 supports for rotation the lower end of a front arm 64. Arms 61 and 64 have elongate slots 65 and 66, espectively, therein, adjacent the upper ends thereof, slots 65 and 66 receiving a pair of movable pins 67 and 68. Pins 67 and 68 are connected to the lower ends of a pair of arm posts 71 and 72, respectively, the upper ends of which are connected to side walls 32 of shelf 30. As shown most clearly in FIGS. 3 and 4, pins 67 and 68 have grooves 73 and 74, respectively, therein for receipt of clips 70 to prevent removal of pins 67 and 68 from slots 65 and 66, respectively, after insertion therein. Springs 75 are connected between the lower ends of arm posts 71 and 72 and pins 76 connected to arms 61 and 64, respectively, adjacent central portions thereof, so as to normally hold pins 67 and 68 in contact with the bottoms of slots 65 and 66, respectively, in arms 61 and 64, respectively. The function of springs 75 will be described more fully hereinafter.

Torsion bar 46 extends across the top of shelf 30, immediately above top lips 33. The opposite ends of torsion bar 46 are connected to the upper ends of a pair of arm extensions 77, the lower ends of which are rigidly connected to the upper ends of front arms 64. Torsion bar 46 rigidizes the assembly of arms 61 and 64 ad shelf 30 to prevent rotation of shelf 30 around the horizontal axis. It should also be noted that arms 61 and 64 are positioned inwardly of side support plates 18 and extend through slots 78 in flanges 17 of base member 14. This arrangement is seen most clearly in FIGS. 1 and 4.

The outer extremities of shaft 44 are connected to the centers of a pair of arms 80, arms 80 being the only elements, other than worm wheel 43, which are physically connected to shaft 44 for rotation therewith. At one end of each arm 80 is an inwardly extended pin 81 which is designed to cooperate with and engage abutments 58A and 58B of disc 56. Extending outwardly from the other end of each arm 80 is a journal 82 which supports for rotation one end of a cassette compression arm 83. Cassette compression arms 83 extend parallel to side support plates 18, on the ouer sides thereof, and the upper ends of arms 83 terminate above shelf 30. The opposite ends of cassette compression crossbar 47 are connected to the upper ends of arms 83. Side support plates 18 have vertically oriented, elongate slots 84 therein, through which crossbar 47 reciprocates during vertical movement thereof, as will be described more fully hereinafter. Crossbar 47 supports a pair of bumpers 48 which are coaxial with hubs 12, for reasons which will appear more fully hereinafter.

Mounted on each lower support plate 19 is a stop 85 which extends outwardly towards rear arms 61, parallel to shaft 44. As will be explained more fully hereinafter, stops 85 are adapted to coperate with and engage abutments 59A and 59B on discs 57. One end of a spring 86 is cnnected to arm 61, adjacent the upper end thereof, above slot 65, whereas the other end of spring 86 is connected to front arm 64, adjacent the central portion thereof. As will be explained more fully hereinafter, springs 86 urge arms 61 and 64 to rotate in a clockwise direction about journals 60 and 63, respectively, so as to extend shelf 30 forwardly. Hereinafter, all references to clockwise and counterclockwise rotation will be as viewed in FIGS. 1, 2, and 5–10.

Figure 3:
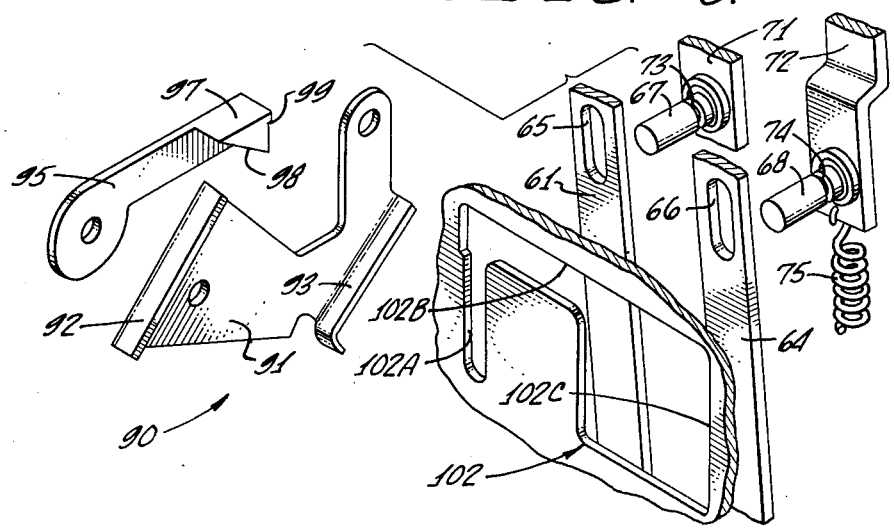
FIG. 3 is an exploded perspective view of the sear mechanism of the loader of FIG. 1.

Cassette loader 10 also includes a single sear assembly, generally designated 90, which may be mounted on either side of loader 10. With reference to FIGS. 1–5, sear assembly 90 includes a first arm 91 having first and second cam surfaces 92 and 93, arm 91 being pivotably connected to one of side plates 18 by means of a journal 94. Sear assembly 90 also includes a latch arm 95, one end of which is pivotably connected to arm 91 by means of a journal 96, the other end of which has a stop 97 defining a cam surface 98 and an abutment 99, A spring 100 connected between arms 91 and 95 biases arm 95 in a counterclockwise direction about journal 96. For present purposes, it should also be noted that each of side support plates 18 has a complex slot 102 therein including an elongate, vertically oriented portion 102A, an elongate, horizontally oriented portion 102B extending forwardly from the top of portion 102A, and a square portion 102C extending forwardly and downwardly from the forward end of portion 102B. As can be seen in FIGS. 3 and 4, one set of pins 67 and 68 extend through slot 102 and engage cam surfaces 92, 93, and 98 and abutment 99, in a manner which will be described more fully hereinafter.

As shown in FIG. 1, shaft 45 has an arm 103 connected thereto, adjacent one of lower support plates 19, arm 103 cooperating with a leaf spring 104 connected to the adjacent support plate 19. When shaft 45 is in the position shown in FIG. 1, leaf spring 104 applies a force to arm 103 in a direction to urge shaft 45 to rotate in a clockwise direction. The function of spring 104 will be described more fully hereinafter.

Cassette loader 10 also inludes a pair of identical microswitches 105 mounted on spacer rod 21, each microswitch 105 having a forwardly directed switch element 106. The function of microswitches 105 will also be described more fully hereinafter.

OPERATION

The operation of cassette loader 10 may be best understood with reference to FIGS. 5–10 which show the sequence of operation thereof. Referring first to FIG. 5, the receiving position of loader 10 is seen where motor 40 has driven shaft 44 in a clockwise direction until pin 81 has come into contact with abutment 58B on disc 56 and stop 85 has come into contact with the opposite abutment 59A on disc 57 so that assembly 54 is locked in the position shown. Movement of assembly 54 to this position defines the positions of gears 52 and 50 and the location of journals 60 and 63, respectively. Thus the lower ends of arms 61 and 64 are fixed from a rotational standpoint.

On the other hand, arms 61 and 64 are free to pivot about journals 60 and 63, respectively, and springs 86 cause arms 61 and 64 to rotate in a clockwise direction until shelf 30 extends forwardly as far as possible. The forward position of shelf 30 is established when pins 68 contact the front of slots 102 in side plates 18. In this position, as shown in FIG. 5, the front of shelf 30 extends through opening 23 in frame element 22.

Shelf 30 is now available for receipt of a cassette 11. Shelf 30 is simply an open shelf which cassette 11 may be easily inserted into without any difficulty. As cassette 11 is inserted into shelf 30, it slides along bottom 31, between side walls 32 and beneath top lips 33. Cassette 11 is inserted into shelf 30 until the rear surface thereof contacts rear lips 34 of shelf 30. At this time, a continued force on cassette 11 by the operator will cause shelf 30 to move rearwardly, pins 67 and 68 pivoting in grooves 65 and 66, respectively, forcing the upper ends of arms 61 and 64 rearwardly, arms 61 and 64 being free to pivot around journals 60 and 63, respectively. During this rearward movement of shelf 30, spring 86 will stretch so that if cassette 11 is released prior to reaching its rearward position, spring 86 will urge arms 61 and 64 forwardly, moving shelf 30 forwardly and ejecting cassette 11.

Still referring to FIG. 5, arm 91 of sear assembly 90 is now in its fully counterclockwise position, being held in this position by means of the friction of journal 94. In addition, spring 100 is urging arm 95 in a counterclockwise direction around journal 96, latch arm 95 being positioned, at this time, parallel to and aligned with portion 102B of slot 102 in side support plate 18. A suitable limit stop (not shown) on arm 91 may be utilized to prevent further counterclockwise rotation of latch arm 95.

Referring now to FIGS. 5 and 6, it is seen that as cassette 11 is inserted into shelf 30, a continued rearward force by the operator causes pivoting of arms 61 and 64 around journals 60 and 63, respectively, and rearward movement of shelf 30. As shelf 30 moves rearwardly, pin 67 slides through portion 102B of slot 102 and comes into contact with cam surface 98 of latch arm 95. Continued movement of shelf 30 causes pin 67 to ride along cam surface 98 so that latch arm 95 rotates in a clockwise direction around journal 96 to the position shown in phantom in FIG. 6, until pin 67 passes cam surface 98. At this time, spring 100 returns latch arm 95 to its lower position.

The function of latch arm 95 may now be understood. That is, as explained previously, springs 86 always urge shelf 30 forwardly. Thus, when shelf 30 arrives at its rearward position, shown in FIG. 6, a mechanism must be provided to prevent arms 61 and 64 and springs 86 from ejecting cassette 11. This is the function of latch arm 95. As can be seen in FIG. 6, release of cassette 11 will cause pin 67 to contact abutment 99, preventing forward movement thereof.

Microswitches 105 are positioned relative to shelf 30 so that the rear corners of cassette 11 contact switch elements 106 when shelf 30 reaches its rearward position. Two microswitches 105 are utilized to insure that cassette 11 has been properly inserted into shelf 30 and that both rear corners of cassette 11 have reached the rearward position. According to the present invention, and as a safety feature, microswitches 105 are two position microswitches, switch elements 106 having both forward and rearward positions. When cassette 11 reaches the rearward position, switch elements 106 are depressed and a first signal is transmitted to the system logic (not shown) to indicate that cassette 11 has been properly loaded. However, nothing further is done until the operator releases cassette 11, causing springs 86 to move shelf 30 forwardly, by a small amount, until pin 67 contacts abutment 99. This permits switch elements 106 to be extended, indicating to the system logic that cassette 11 has been released. At this time, a signal is directed to motor 40 to cause rotation of shaft 44 through an angle of 360°.

Referring now to FIG. 7, cassette loader 10 is shown after shaft 44 has rotated through an angle of 90°. As explained previously, shaft 44 is connected only to arms 80 which are connected to cassette compression arms 83. Accordingly, as shaft 44 begins to rotate, arms 80 are rotated in a counterclockwise direction, as shown, drawing cassette compression arms 83 downwardly. On the other hand, since pin 81 is also moving in a counterclockwise direction, it releases abutment 58B on disc 56 and there is no driving force transmitted to assembly 54 by shaft 44.

As arms 83 draw cassette compression crossbar 47 downwardly, bumpers 48 contact the top of cassette 11, coaxial with the reels therein, forcing cassette 11 downwardly. This downward force on cassette 11 is transmitted to shelf 30 so that shelf 30 is urged downwardly. Since pins 67 and 68 are resting in the bottoms of slots 65 and 66, respectively, this downward force on cassette 11 is eventually transmitted to arms 61 and 64. Since, as mentioned previously, pin 81 on arm 80 has released abutment 58B on disc 56, it is now free to rotate in a counterclockwise direction. Recalling that leaf spring 104 is urging arm 103 in a clockwise direction, shaft 45 is caused to rotate clockwise rotating gears 50 clockwise which simultaneously rotate gears 52 and assemblies 54 counterclockwise. In other words, leaf spring 104 immediately causes assembly 54 to rotate to try to follow pin 81 as soon as pin 81 releases disc 56 of assembly 54. Therefore, even though shaft 44 does not drive assembly 54 and gears 50 and 52, such elements begin to rotate, pivoting journals 60 and 61 outwardly and downwardly, as shown in FIG. 7.

Still referring to FIG. 7, it is seen that as arms 61 and 64 move downwardly, pins 67 and 68, respectively, attached thereto, also move downwardly in portions 102A and 102C, respectively, of slot 102 in side plate 18. Thus, while pin 67 now moves beneath stop 97 on latch arm 95, arms 61 and 64 are prevented from moving forward because of the channel provided by portion 102A of slot 102. On the other hand, as pin 67 moves downwardly through portion 102A of slot 102, it reaches and comes into contact with cam surface 93 on arm 91. FIG. 7 shows arm 91 shortly after it has been first contacted by pin 67. Since arm 91 is pivoted by journal 94 on side plate 18, it can be seen that pin 67 causes clockwise rotation of arm 91. The reason for this will appear more clearly hereinafter.

Figure 8:
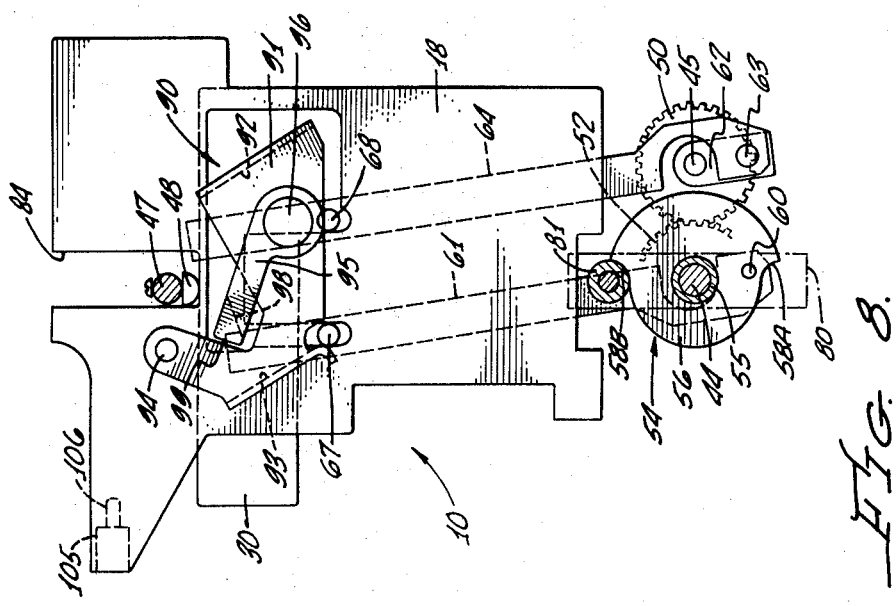

Referring now to FIG. 8, shaft 44 has been driven through an angle of 180°. Pin 67 has rotated arm 91 to its fully clockwise position, where it may be prevented from further rotation by the friction of journal 94. For the time being, it should be noted that rotation of arm 91 to the position shown in FIG. 8 has caused a corresponding rotation of latch arm 95 therewith so that cam surface 98 of latch arm 95 is now positioned directly above pin 67. The reason for this will appear more fully hereinafter.

Still referring to FIG. 8, journals 82 at the lower ends of cassette compression arms 83 are now at their fully lowered positions and cassette compression crossbar 47 is also in its lowered position. In the rearward position of shelf 30, which is the position shown in FIGS. 6, 7, and 8, holes 35 in shelf bottom 31 are coaxial with hubs 12, holes 36 in shelf bottom 31 are aligned with posts 26 on base member 14, and the slots (not shown) in the bottom of cassette 11 are aligned with pins 27 on base member 14. Thus, as cassette compression crossbar 47 forces cassette 11 and shelf 30 downwardly, hubs 12 pass through holes 35 in shelf bottom 31 and enter the reels in cassette 11, posts 26 extend through holes 36 in shelf bottom 31 and contact the bottom surface of cassette 11, at the four corners thereof, and pins 27 enter the apertures in cassette 11. It is significant to note that when shaft 44 reaches the 180° position, a substantial force is exerted through arms 83 and crossbar 47 to bumpers 48 so that the top surface of cassette 11 is so compressed that it comes into contact with the reels therein, forcing the reels down on hubs 12. This force insures a proper seating of the cassette reels on drive hubs 12 and insures proper subsequent operation of the video recorder/reproducer. Simultaneously with this operation, hubs 12 may be provided with a mechanism for gripping the reels in cassette 11 to provide a positive driving force. Such a mechanism is described in my copending U.S. Patent application Ser. No. 650,456 entitled Tape Reel Drive System for Video Recorder/Reproducer, filed concurrently herewith.

According to the present invention, shaft 44 continues to rotate through an additional angle of 180 for two purposes. Initially, once cassette compression crossbar 47 has achieved its function of forcing the cassette reels onto hubs 12, it must be elevated off of cassette 11 so that the reels therein may continue to operate freely. Secondly, while pins 27 establish the horizontal position of cassette 11, posts 26 in and of themselves do not establish the vertical position thereof. That is, as mentioned previously, cassette 11 may be warped and may not firmly rest on posts 26. Thus, cassette loader 10 provides means for clamping the side edges of cassette 11 down on posts 26 to force cassette 11 into a desired position thereby eliminating any problems resulting from warp.

Figure 9:
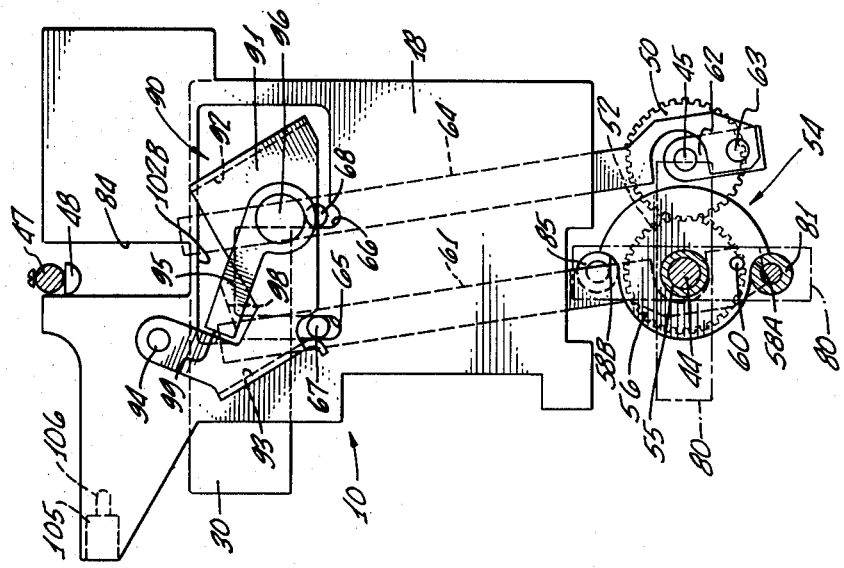

As mentioned previously, FIG. 8 shows the position of cassette loader 10 after drive shaft 44 has rotated through an angle of 180°. In this position, assemblies 54 have also rotated through an angle of 180°, for the reasons given previously, and stops 85 have engaged abutments 59B on discs 57 of assemblies 54, preventing any further rotation thereof. Therefore, as arms 80 continue to rotate with drive shaft 44, pins 81 connected thereto move away from abutments 58B on discs 56 and swing around to abutments 58A on discs 56. An intermediate position of one of arms 80 is shown in phantom in FIG. 9. During this second 180° of rotation of shaft 44, the only event that occurs is that arms 83 are swinging upwardly, moving cassette compression crossbar 47 back to its upper position. This upper position is shown in FIG. 9.

As soon as cassette compression chamber 47 starts moving upwardly, shelf 30 is released in that pin 81 has moved away from abument 58B of disc 56 and there is no force holding abutment 59B of disc 57 against stop 85. However, as arm 80 continues to rotate, pin 81 eventually comes into contact with abutment 58A on disc 56, rotating assembly 54 therewith in a counter-clockwise direction until abutment 59B on disc 57 contacts stop 85. This locks assemblies 54 in the position shown in FIG. 9, insuring that journals 60 and 63 connected to the lower ends of arms 61 and 64, respectively, are in their lower positions.

The significant thing to note here is that the location of slots 65 and 66 in arms 61 and 64, respectively, and the length of arms 61 and 64 relative to upper surface 25 of base member 14 is such that pins 67 and 68 cannot remain in contact with the lower ends of slots 65 and 66, respectively, in the lowered position of shelf 30. In other words, prior to the time that journals 60 and 63 reach the positions shown in FIG. 9, posts 26 contact the bottom of cassette 11 and top lips 33 contact the top of cassette 11, preventing further downward movement of shelf 30. Thus, during the last few degrees of rotation of gears 50 and 52, arms 61 and 64 are pulled downwardly, relative to shelf 30 and slots 65 and 66 move downwardly relative to pins 67 and 68, respectively, stretching springs 75. This stretching of springs 75 places a predetermined tension force on top lips 33 of shelf 30, through arm posts 72 and side walls 32. Thus, the side edges of the top of cassette 11 are forced downwardly, forcing the bottom four corners thereof into contact with posts 26 and establishing a fixed vertical position for cassette 11.

When it is desired to eject cassette 11, it is only necessary to signal the system logic to cause motor 40 to reverse its direction to rotate drive shaft 44 in a clockwise direction, through an angle of 360°. This rotation of shaft 44 fully activates the ejection mechanism. More particularly, during the first 180° of rotation of shaft 44, only arms 80 rotate 180° from the position shown in FIG. 9 to the position shown in FIG. 8 so that cassette compression crossbar 47 is again brought into contact with cassette 11. During the next 90° of rotation, where shaft 44 goes from the position shown in FIG. 8 to the position shown in FIG. 7, pin 81 on arm 80 contacts abutment 58B on disc 56, causing clockwise rotation of disc 56 and assembly 54. Since assembly 54 is connected to gear 52 and since gear 52 is connected to gear 50, arm 80 now drives gears 50 and 52, rotating journals 60 and 63 outwardly and upwardly.

Figure 10:
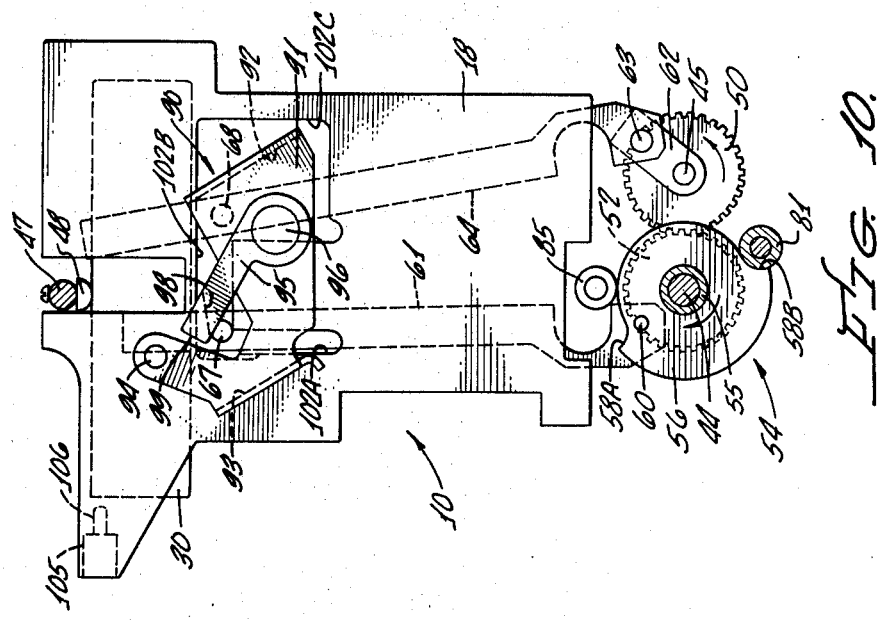

Referring now to FIG. 10, it is seen that as arms 61 and 64 move upwardly, pin 67 passes in front of cam surface 93 on arm 91 of sear assembly 90. As mentioned previously with regard to the discussion of FIG. 8, arm 91 and latch arm 95 have been rotated so that cam surface 98 is now directly above pin 67. Thus, when pin 67 reaches the position shown in FIG. 10, which is only a few degrees before the starting position, pin 67 contacts cam surface 98, causing clockwise rotation of latch arm 95 relative to arm 91 about journal 96. In other words, pin 67 does not return to its position behind abutment 99, but rather elevates latch arm 95 and is free to move forwardly. It can also be seen in FIG. 10 that at this same time, pin 67 has reached a point where it is no longer prevented from moving forward by portion 102A of slot 102 in side support plate 18. Thus, just as shaft 44 returns to its initial position, spring 86 causes clockwise rotation of arms 61 and 64 about journals 60 and 63, respectively. This action of spring 86 throws shelf 30 forwardly to the position shown in FIG. 5, ejecting cassette 11.

Still referring to FIG. 10, it should further be noted that at the position shown, just before arms 61 and 64 have begun to move forwardly, arm 91 of sear assembly 90 is still in its clockwise position. However, it can be seen from an inspection of FIG. 10 that cam surface 92 of arm 91 is now directly in the path of pin 68 extending through slot 66 in arm 64. Thus, as arms 61 and 64 pivot forwardly, as described previously, pin 68 contacts cam surface 92 and forces arm 91 to rotate in a counterclockwise direction until it returns to the position shown in FIGS. 5 and 6. This returns latch arm 95 to its starting position so that it can again operate to latch pin 67 in the rearward position when cassette 11 is again inserted into shelf 30 and moved rearwardly.

It can therefore be seen that according to the present invention, there is provided a cassette loader 10 for a video recorder/reproducer which virtually eliminates the problems discussed hereinbefore. Cassette loader 10 is ideally suited for use with a video recorder/reproducer usable in a document acquisition and retrieval system. Cassettes 11 are loadable into loader 10 in a foolproof manner by an untrained operator and the possibilities for jamming are minimized. With loader 10, video cassette 11 is delivered onto reel drive hubs 12 in such a manner that the proper seating of the reels onto hubs 12 is insured. Loader 10 establishes both a vertical and a horizontal position for cassette 11 and clamps cassette 11 in such position so as to eliminate the problems caused by warping or finite variations in the tolerances and dimensions in cassette 11. Therefore, when the tape in cassette 11 is run at high speeds, it will not rub, bump, or touch anything within cassette 11 and the possibility of damaging the tape is minimized. Loader 10 may be positioned at any angle and will eject cassette 11 when it is desired to remove it from the video system.

While the invention has been described with respect to the preferred physical embodiment constructed in accordance therewith, it will be apparent to those skilled in the art that various modifications and improvements may be made without departing from the scope and spirit of the invention. Accordingly, it is to be understood that the invention is not to be limited by the specific illustrative embodiment, but only by the scope of the appended claims.

I claim:

1. A loading mechanism for delivering a standard video cassette onto a pair of reel drive hubs comprising:
   means for receiving said video cassette, said receiving means including an open shelf having a bottom and opposed side walls;
   means for lowering said receiving means shelf and said video cassette therein onto said drive hubs, said drive hubs extending through a pair of openings in said shelf bottom;
   support means extending through said shelf bottom, adjacent the four corners thereof, for contacting the bottom of said cassette in the lowered position of said shelf;
   means contacting the top of said cassette for clamping said cassette down onto said support means; and
   means operative when said receiving means shelf reaches said lowered position for momentarily applying a force to said top of said cassette, directly above the reels therein, to force said reels onto said reel drive hubs.

2. A loading mechanism according to claim 1 wherein said clamping means comprises:
   a pair of top lips connected to said side walls of said shelf and extending parallel to said shelf bottom, said top lips contacting said top of said cassette, along the side edges thereof, for clamping said cassette onto said support means.

3. A loading mechanism according to claim 2 wherein said shelf lowering means comprises:
   rotatable drive means; and
   a plurality of arms interconnecting said rotatable drive means and said receiving means shelf; and wherein said clamping means further comprises:
   spring means connected between said arms and said shelf for providing a fixed clamping force to said cassette.

4. A loading mechanism according to claim 1 wherein said receiving means shelf is horizontally transferable between a forward, cassette receiving position and a rearward position.

5. A loading mechanism according to claim 4 wherein said shelf moves under control of said cassette from said forward to said rearward position upon insertion of said cassette into said shelf by an operator.

6. A loading mechanism according to claim 5 further comprising:
   means for sensing that both rear corners of said cassette have reached said rearward position.

7. A loading mechanism according to claim 6 further comprising:
   means for sensing release of said cassette by said operator for activating said receiving means lowering means.

8. A loading mechanism according to claim 5 further comprising:
   a sear mechanism operative upon manipulation of said shelf to said rearward position for locking said shelf in said rearward position upon movement of said cassette thereto by said operator.

9. A loading mechanism according to claim 1 further comprising:
   a frame, said reel drive hubs being supported by said frame and extending upwardly from the upper surface thereof; and wherein said support means comprises:
   four posts connected to said upper surface of said frame, adjacent the four corners thereof, said posts extending through openings in said shelf bottom to contact the bottom of said cassette.

10. A loading mechanism according to claim 9 wherein said clamping means comprises:
    a pair of lips connected to said shelf side walls, coplanar with each other and parallel to said shelf bottom, said lips contacting the side edges of said top of said cassette for urging said cassette downwardly onto said posts.

11. A loading mechanism according to claim 10 wherein said shelf lowering means comprises:
    rotatable drive means; and
    a plurality of arms interconnecting said rotatable drive means and said receiving means shelf; and wherein said clamping means further comprises:
    spring means connected between said arms and said shelf for providing a fixed clamping force to said cassette.

12. A loading mechanism according to claim 1 wherein said shelf lowering means comprises:
    a rotary drive shaft; and a plurality of arms connected between said drive shaft and said receiving means shelf for lowering or raising said shelf upon rotation of said drive shaft.

13. A loading mechanism according to claim 12 wherein said force applying means comprises:
   a pair of parallel, spaced arms;
   a crossbar connected between the upper ends of said arms, said crossbar extending above said receiving means shelf and said video cassette therein;
   a pair of bumpers connected to said crossbar and aligned with said cassette reels; and
   means connecting the lower ends of said arms to said rotary drive shaft for lowering said arms and said crossbar with said receiving means shelf, said crossbar bumpers contacting said top of said cassette and applying said force thereto when said receiving means reaches said lowered position.

14. A method for loading a video cassette onto a pair of reel drive hubs comprising the steps of:
   providing an open shelf having a bottom and opposed side walls for receiving said video cassette;
   lowering said shelf and said cassette therein onto said drive hubs, said drive hubs extending through openings in said shelf bottom;
   supporting the four corners of said cassette independently of said shelf when said shelf reaches the lowered position;
   appling a clamping force to the top of said cassette to clamp the four corners of said cassette; and
   applying a force to said top of said cassette, directly above the reels therein, when said shelf reaches said lowered position to force said reels onto said drive hubs.

15. A method according to claim 14 wherein the shelf is horizontally transferable upon insertion of said cassette thereinto between a forward, cassette receiving position and a rearward position and further comprising the step of:
   sensing that both rear corners of the cassette have reached said rearward position.

16. A method according to claim 15 further comprising:
   sensing release of said cassette by the operator prior to lowering said shelf.

17. A method according to claim 16 further comprising:
   locking said shelf in said rearward position upon movement of said cassette thereto by said operator.

* * * * *